(12) United States Patent
Ramanathan et al.

(10) Patent No.: US 9,620,803 B2
(45) Date of Patent: Apr. 11, 2017

(54) SOLID OXIDE FUEL CELL WITH REINFORCED ELECTROLYTE MEMBRANE

(71) Applicants: Shriram Ramanathan, Acton, MA (US); Alexander C. Johnson, Cambridge, MA (US)

(72) Inventors: Shriram Ramanathan, Acton, MA (US); Alexander C. Johnson, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 233 days.

(21) Appl. No.: 14/645,373

(22) Filed: Mar. 11, 2015

(65) Prior Publication Data

US 2015/0188176 A1 Jul. 2, 2015

Related U.S. Application Data

(63) Continuation of application No. 12/567,615, filed on Sep. 25, 2009, now abandoned.

(60) Provisional application No. 61/100,088, filed on Sep. 25, 2008.

(51) Int. Cl.
| | |
|---|---|
| *H01M 8/12* | (2016.01) |
| *H01M 8/124* | (2016.01) |
| *H01M 8/1246* | (2016.01) |
| *H01M 8/1213* | (2016.01) |
| *H01M 8/1226* | (2016.01) |
| *H01M 8/0258* | (2016.01) |
| *H01M 8/0297* | (2016.01) |
| *H01M 8/1253* | (2016.01) |
| *H01M 8/126* | (2016.01) |

(52) U.S. Cl.
CPC ........ *H01M 8/124* (2013.01); *H01M 8/0258* (2013.01); *H01M 8/0297* (2013.01); *H01M 8/1213* (2013.01); *H01M 8/1226* (2013.01); *H01M 8/1246* (2013.01); *H01M 8/126* (2013.01); *H01M 8/1253* (2013.01); *H01M 8/1266* (2013.01); *H01M 2008/1293* (2013.01); *H01M 2300/0074* (2013.01); *H01M 2300/0077* (2013.01); *Y02E 60/525* (2013.01); *Y02P 70/56* (2015.11)

(58) Field of Classification Search
None
See application file for complete search history.

(56) References Cited

U.S. PATENT DOCUMENTS

| 6,641,948 B1 * | 11/2003 | Ohlsen | H01M 4/8605 |
| | | | 429/480 |
| 2002/0155335 A1 * | 10/2002 | Kearl | H01M 4/8885 |
| | | | 429/465 |
| 2003/0138685 A1 * | 7/2003 | Jankowski | H01M 8/1097 |
| | | | 429/434 |

* cited by examiner

*Primary Examiner* — Ula C Ruddock
*Assistant Examiner* — Tony Chuo
(74) *Attorney, Agent, or Firm* — Elizabeth Kim Patent Law Offices LLC

(57) ABSTRACT

A solid oxide fuel cell has a reinforced membrane-electrode assembly. The solid oxide fuel cell includes a first electrode layer, a second electrode layer, and an electrolyte membrane disposed between the first and second electrode layers. The solid oxide fuel cell further includes a gas-permeable structure adjacent to one or both of the electrode layers, for mechanical stabilization.

20 Claims, 6 Drawing Sheets

SOLID OXIDE FUEL CELL WITH REINFORCED ELECTROLYTE MEMBRANE

CROSS-REFERENCE TO RELATED APPLICATIONS

This application is a continuation of application Ser. No. 12/567,615, filed on Sep. 25, 2009, entitled "Solid Oxide Fuel Cell With Reinforced Electrolyte Membrane," which claims the benefit of U.S. Provisional Application No. 61/100,088, filed on Sep. 25, 2008, entitled "Robust Thin Film Fuel Cells." The foregoing applications are incorporated herein by reference in their entireties.

BACKGROUND

Fuel cells are devices that generate electricity by a chemical reaction. A fuel cell has two electrodes, and an electrolyte in between the two electrodes. A solid oxide fuel cell is one type of a fuel cell that has a solid oxide electrolyte, and generate electricity by oxidizing fuel. Solid oxide fuel cells are an attractive option as alternate energy sources because of their high energy efficiency.

One challenge is that solid oxide fuel cells generally require a high operating temperature. Much current research on solid oxide fuel cells is directed to the use of submicron electrolyte membranes to decrease the operating temperature of the fuel cell. Such submicron electrolyte membranes are extremely fragile on their own, however, and rupture easily as a result of slight pressure, vibration or thermal stress.

BRIEF DESCRIPTION OF DRAWINGS

The drawings disclose illustrative embodiments. They do not set forth all embodiments. Other embodiments may be used in addition or instead. When the same numeral appears in different drawings, it refers to the same or like components or acts.

FIG. 1A illustrates an electrolyte membrane on a surface of a first substrate, and an electrode on the electrolyte membrane.

FIG. 1B illustrates a second substrate bonded to the top of the first substrate and etched to provide flows channels and supply and return holes.

FIG. 1C illustrates injection of a gel through the supply holes to fill the flow channels.

FIG. 1D illustrates a gas-permeable structure generated by drying the gel that has been injected to fill the flow channels.

FIG. 1E illustrates the backside of the first substrate, which is etched to create a second set of flow channels and release the electrolyte membrane.

FIG. 2A illustrates gel that is poured into the backside flow channels of the solid oxide fuel cell.

FIG. 2B illustrates a third substrate bonded to the bottom of the solid oxide fuel cell shown in FIG. 2A.

FIG. 2C illustrates gel injected through supply holes etched in the third substrate and dried.

DETAILED DESCRIPTION

Solid oxide fuel cells are disclosed that have a reinforced membrane-electrode assembly to provide mechanical stabilization. In some embodiments, after fabricating the membrane-electrode assembly with thin films, the assembly is supported with a gel before being released. In some embodiments, the gel is rigid but porous enough to facilitate gas flow across the electrolyte membrane. In some embodiments, the gel is a conductive gel, including but not limited to carbon aerogels.

Illustrative embodiments are now discussed. Other embodiments may be used in addition or instead.

FIGS. 1A-1E are cross-sectional views of successive stages of fabrication of a solid oxide fuel cell that has a reinforced thin-film membrane-electrode assembly, in accordance with an embodiment of the present disclosure. In overview, the solid oxide fuel cell disclosed in FIGS. 1A-1E include a first electrode layer, a second electrode layer, a solid oxide electrolyte membrane between the first and second electrode layers, and a gas-permeable structure adjacent to one of the electrode layers.

Figure 1A:
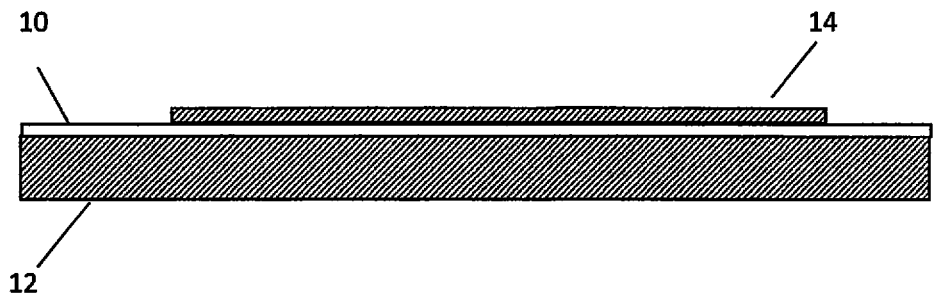
FIGS. 1A-1E are cross-sectional views of successive stages of fabrication of a solid oxide fuel cell that has a reinforced thin-film membrane-electrode assembly, in accordance with an embodiment of the present disclosure.

FIG. 1A illustrates an electrolyte membrane 10 deposited on a first substrate 12, and a first electrode layer 14 formed on the electrolyte membrane 10. The electrolyte membrane 10 is a solid oxide electrolyte membrane. The electrolyte membrane 10 is fabricated on a surface of the substrate 12, which serves as a support substrate. The first electrode layer 14 is fabricated on the electrolyte membrane 10.

Suitable materials for the electrolyte membrane 10 include, but are not limited to, yttria-doped zirconia, yttria-doped ceria, or yttria-doped hafnia wherein dopant concentration can be approximately in the range of 0.1 to 20 mol %. Other candidate materials include without limitation bismuth oxide ($Bi_2O_3$), lanthanum gallate, ceria, and Y-doped barium cerate.

A suitable material for the substrate 12 includes silicon. Other materials for the substrate 12 include, but are not limited to: semiconductors other than silicon; metals; and glass.

Figure 1B:
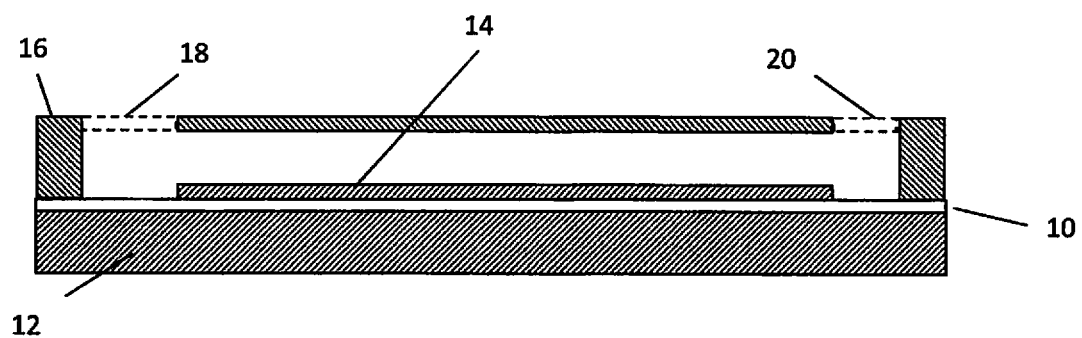

FIG. 1B illustrates a second substrate 16 bonded to the first substrate 12. As shown in FIG. 1B, the second substrate 16 is bonded to the top of the support substrate 12. The second substrate 16 is etched or machined to provide flow channels and supply and return pathways or through holes 18 and 20 into the second substrate.

Figure 1C:
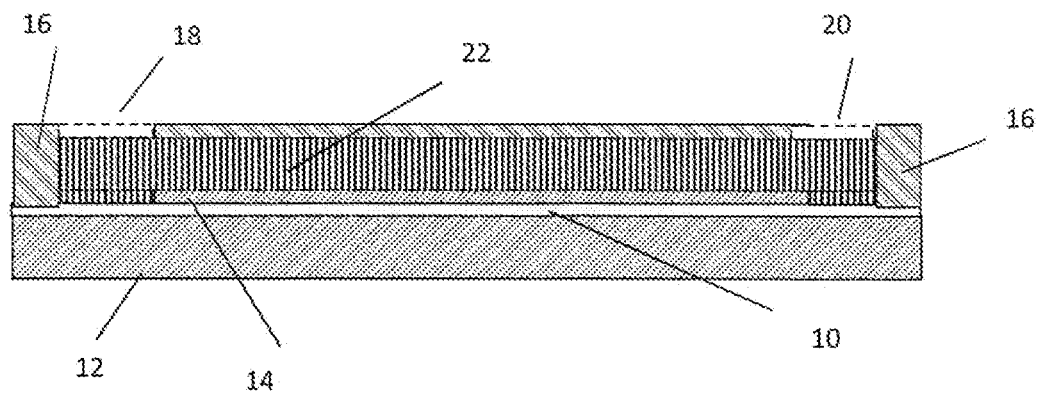

FIG. 1C illustrates injection of a gel 22 through the supply holes to fill the flow channels. The gel 22 along with its liquid component is injected through the supply hole 18 in the substrate 16, filling the flow channels. Thereafter, material may be removed from the first substrate 12 to create second flow channels and to release the electrolyte layer.

Figure 1D:
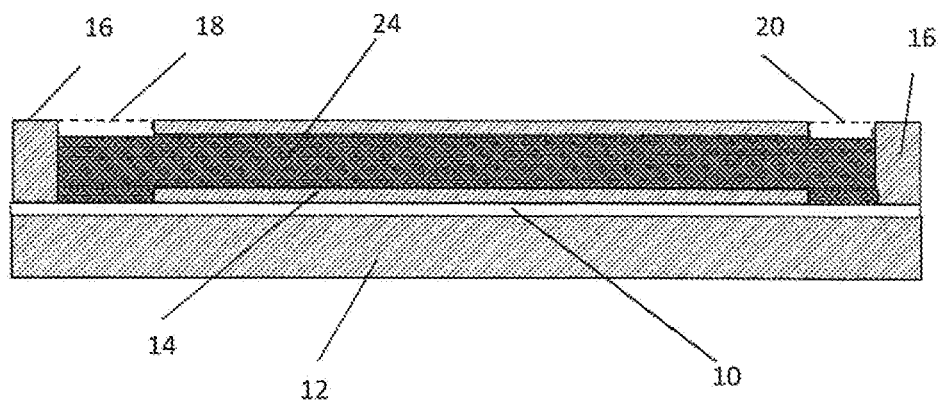

FIG. 1D illustrates a gas-permeable structure generated by drying the gel. The gel 22 is dried leaving a structural, yet gas permeable, structure 24 filling the flow channels as shown in FIG. 1D.

Figure 1E:
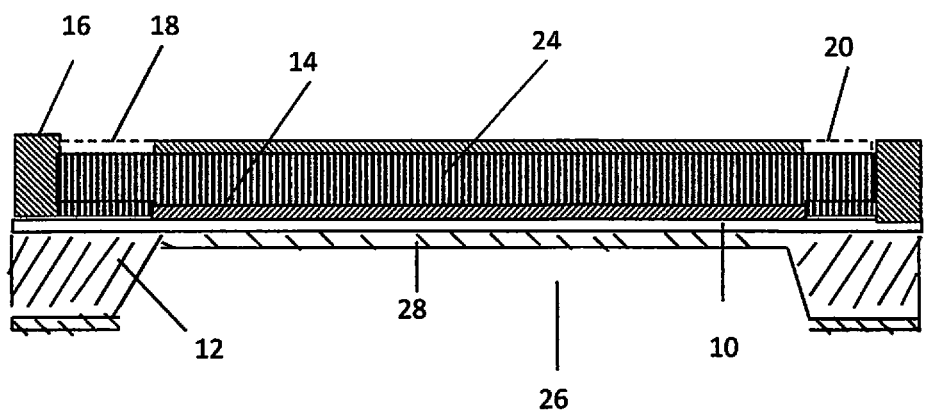

FIG. 1E illustrates the backside of the first substrate. As shown in FIG. 1E, the backside of the wafer 12 is etched thereby creating a second set of flow channels 26 and releasing the membrane 10. In one embodiment, a back electrode 28 may be deposited.

The resulting structure shown in FIG. 1E is a completed solid oxide fuel cell, ready to be bound to other cells as a stack and finished with top and bottom cap wafers (or substrates), using procedures known to those of skill in the art.

In other embodiments, even more robust arrangements can be implemented by supporting the membrane-electrode assembly with gels on both sides.

Figure 2A:
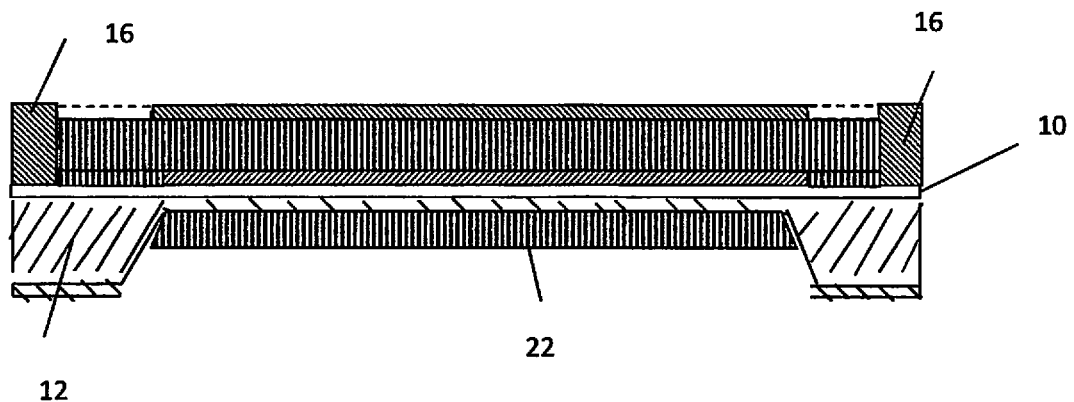
FIGS. 2A-2C are cross-sectional views of the fabrication of a solid oxide fuel cell with reinforced thin-film membrane-electrode assembly, in accordance with another embodiment of the present disclosure.
Figure 2B:
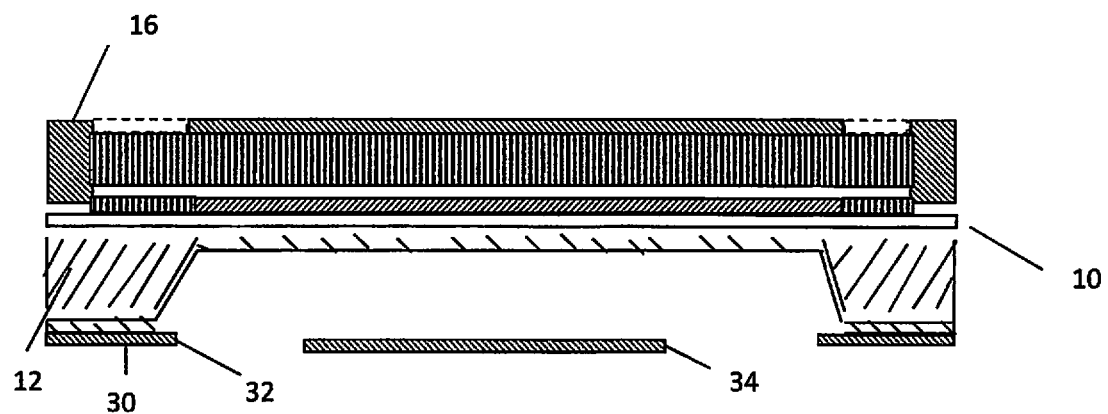
Figure 2C:
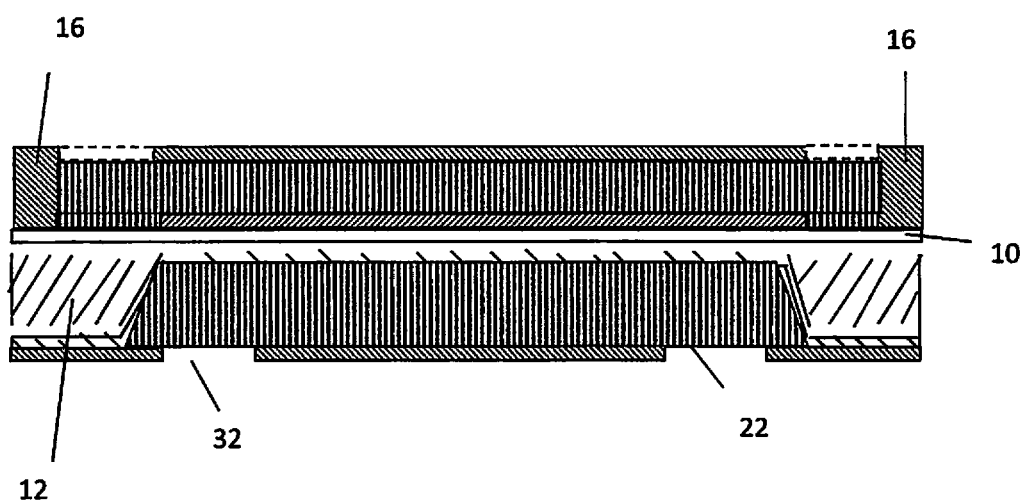

FIGS. 2A-2C are cross-sectional views of the fabrication of a solid oxide fuel cell with reinforced thin-film membrane-electrode assembly, in accordance with another embodiment of the present disclosure.

FIG. 2A illustrates gel that is poured into the backside flow channels of the solid oxide fuel cell. In the embodiment illustrated in FIG. 2A, gel 22 is poured into the backside flow channels and dried. The additional gel 22 provides additional strength to the membrane 10 preventing it from delaminating from the top-side gel. The strength may be limited by how well the gel adheres to the sidewalls of the flow channels. Further, gas preferentially flows over the gel rather than through it so reactant concentration may be reduced at the electrode.

In some embodiments, the membrane-electrode assembly can be fully supported on both sides by adding one extra layer to the solid oxide fuel cell. FIG. 2B illustrates a third substrate bonded to the bottom of the solid oxide fuel cell shown in FIG. 2A. As shown in FIG. 2B, a third or bottom wafer 30 is etched or machined to provide pathways or through holes 32 and 34 and the third wafer 30 is then bounded to the bottom of the cell.

FIG. 2C illustrates a gel 22 injected through the supply pathways etched in the third substrate and dried. The gel 22 is injected through the supply hole 32 and dried. The resulting cell is very robust. Many such cells can be bonded together into a stack and finished with top and bottom wafers.

In one or more of the embodiments discussed above, the top substrate of one cell is used to help supply gas to the bottom of the cell above it, and to use the bottom or support substrate to help supply gas to the top of the cell below it. In these embodiments, the top and bottom cells include substrates that perform this role.

Figure 3:
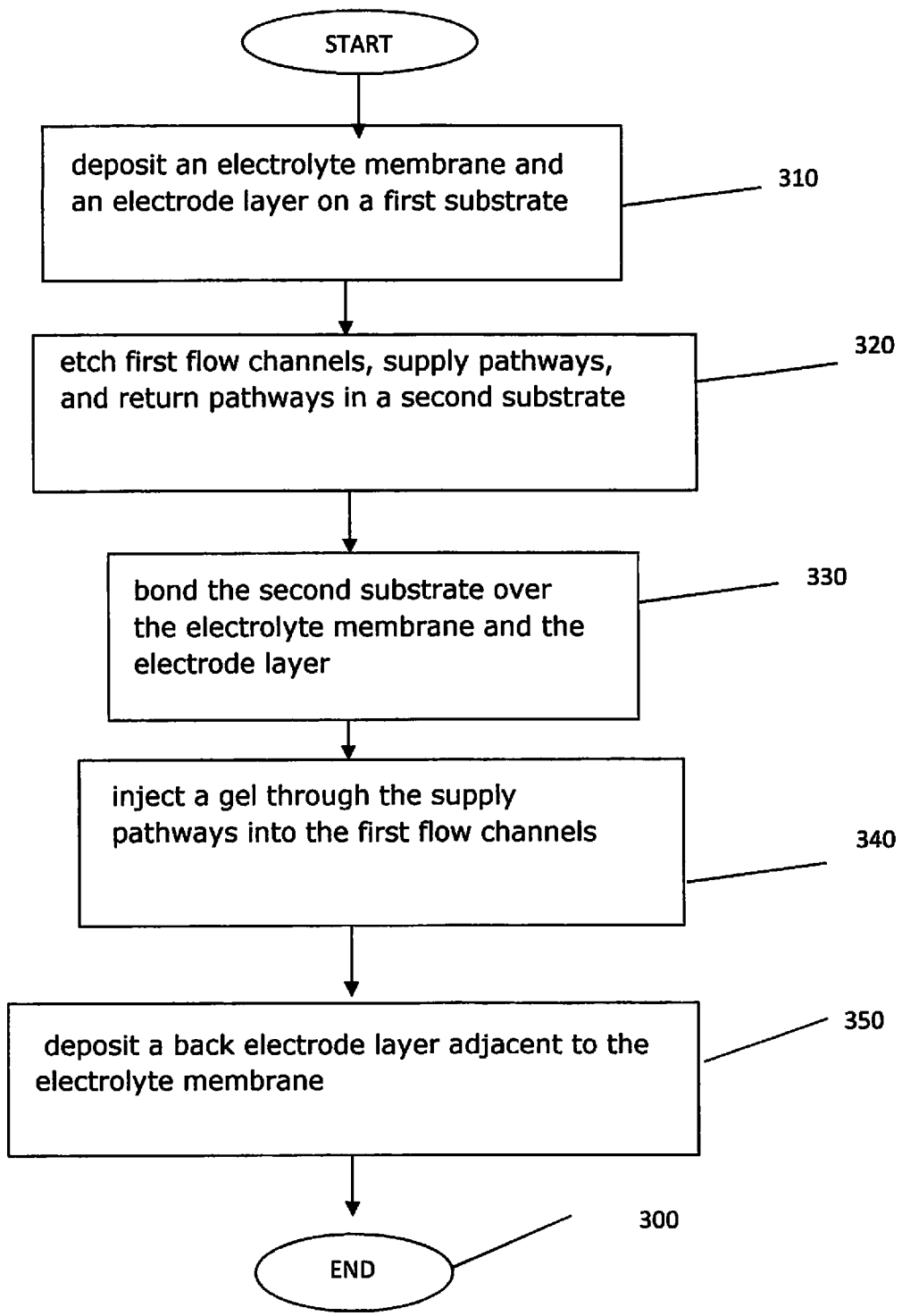
FIG. 3 is a schematic flow chart of a method of fabricating a solid oxide fuel cell having reinforced electrolyte membrane, in accordance with one embodiment of the present disclosure.

FIG. 3 is a schematic flow chart of a method 300 of fabricating a solid oxide fuel cell having reinforced electrolyte membrane, in accordance with one embodiment of the present disclosure. The method 300 includes an act 310 of depositing an electrolyte layer on a first substrate. The method 300 further includes an act 320 of etching first flow channels, supply pathways, and return pathways in a second substrate.

The method 300 further includes an act 330 of bonding the second substrate over the electrolyte membrane and the electrode layer. The method 300 further includes an act 340 of injecting a gel through the supply pathways into the first flow channels. The method 300 further includes an act 350 of depositing a back electrode layer adjacent to the electrolyte membrane.

In the embodiments described above, the electrode layers and electrolyte membranes can be deposited or fabricated using thin film deposition techniques known in the art. The etching of flow channels, supply pathways, and return pathways can also be done using etching techniques known in the art.

In sum, methods and systems have been described for reinforcing the electrolyte membranes in solid oxide fuel cells so as to stabilize these fragile membranes.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

Nothing that has been stated or illustrated is intended to cause a dedication of any component, step, feature, object, benefit, advantage, or equivalent to the public. While the specification describes particular embodiments of the present disclosure, those of ordinary skill can devise variations of the present disclosure without departing from the inventive concepts disclosed in the disclosure.

While certain embodiments have been described of systems and methods relating to vanadium oxide thin films, it is to be understood that the concepts implicit in these embodiments may be used in other embodiments as well. In the present disclosure, reference to an element in the singular is not intended to mean "one and only one" unless specifically so stated, but rather "one or more." All structural and functional equivalents to the elements of the various embodiments described throughout this disclosure, known or later come to be known to those of ordinary skill in the art, are expressly incorporated herein by reference.

What is claimed is:

1. A method comprising:
   depositing an electrolyte membrane onto a surface of a support substrate;
   depositing a first electrode layer over the electrolyte membrane;
   bonding an upper substrate over the electrolyte membrane and the first electrode layer on the support substrate, the upper substrate having etched therein a set of flow channels and a supply pathway;
   injecting a gel through the supply pathway and into the flow channels of the upper substrate; and
   providing reinforcing support for the electrolyte membrane by drying the gel so that the dried gel forms a gas-permeable structure that supports the electrolyte membrane.

2. The method of claim 1, wherein the electrolyte membrane is a solid oxide electrolyte membrane.

3. The method of claim 1, further comprising the act of etching the set of flow channels and the supply pathway in the upper substrate.

4. The method of claim 1, further comprising:
   removing material from a backside of the support substrate opposite said surface so as to etch a set of backside flow channels in the support substrate.

5. The method of claim 4, further comprising:
   removing material from the backside of the support substrate so as to release the electrolyte membrane.

6. The method of claim 5, wherein the electrolyte membrane is a solid oxide electrolyte membrane, and further comprising the act of:
   depositing a back electrode layer onto said backside of the support substrate so that the electrolyte membrane is disposed between said first electrode layer and the back electrode layer, thereby generating a solid oxide fuel cell.

7. The method of claim 4, further comprising injecting a second gel into the backside flow channels of the support substrate.

8. The method of claim 7, further comprising drying the second gel so as to provide additional strength to the electrolyte membrane.

9. The method of claim 7, further comprising drying the second gel so as to prevent the electrolyte membrane from delaminating from the gel injected into the flow channels of the upper substrate.

10. The method of claim 1, wherein the upper substrate has further etched therein a return pathway, and further comprising the act of etching the flow channels and the supply and return pathways in the upper substrate.

11. The method of claim 8, further comprising:
establishing supply and return pathways in a third substrate; and
bonding the third substrate to the support substrate.

12. The method of claim 11, further comprising:
injecting a third gel through the supply pathway into the flow channels of the third substrate.

13. The method of claim 12, further including the act of drying the third gel.

14. The method of claim 1, wherein the act of injecting the gel comprises injecting the gel so as to fill the flow channels of the upper substrate, and wherein the gas-permeable structure fills said flow channels.

15. The method of claim 1, wherein the gas-permeable structure is rigid.

16. The method of claim 1, wherein the gas-permeable structure is porous so as to allow gas flow through the electrolyte membrane.

17. The method of claim 1, wherein the gel comprises at least one of: carbon aerosol; and a conductive material.

18. The method of claim 1, wherein the support substrate and the upper substrate comprise at least one of:
silicon; a semiconductor other than silicon; a metal; and glass.

19. The method of claim 1, wherein the electrolyte membrane comprises at least one of:
yttria-doped zirconia; yttria-doped ceria; yttria-dope hafnia; bismuth oxide; lanthanum gallate; ceria; and Y-doped barium cerate.

20. A method comprising:
providing reinforcing support for a solid oxide electrolyte membrane in a solid oxide fuel cell, comprising the acts of:
depositing the solid oxide electrolyte membrane onto a support substrate;
depositing an electrode layer over the solid oxide electrolyte membrane;
bonding an upper substrate over the electrolyte membrane and the electrode layer on the support substrate, wherein the upper substrate includes a set of flow channels, a supply pathway, and a return pathway etched therein;
injecting a gel through the supply pathways and into the flow channels of the upper substrate; and
drying the gel to form a gas-permeable structure that fills the flow channels so as to mechanically stabilize the electrolyte membrane before the electrolyte membrane is released.

* * * * *